United States Patent [19]

Belcher et al.

[11] Patent Number: 5,557,495
[45] Date of Patent: Sep. 17, 1996

[54] VARIABLE CAPACITOR AND METHOD

[75] Inventors: Donald K. Belcher, W. Melbourne; David C. Bailey, Cocoa Beach, both of Fla.

[73] Assignee: Harris Corporation, Melbourne, Fla.

[21] Appl. No.: 313,596

[22] Filed: Sep. 29, 1994

[51] Int. Cl.⁶ .................. H01G 5/01; H01G 5/16
[52] U.S. Cl. ............ 361/298.2; 361/277; 361/283.1; 361/287; 361/298.1; 361/299.4; 361/299.5; 361/298.3; 361/298.4
[58] Field of Search ............ 361/298.2, 298.3, 361/290, 299.3, 277, 283.1, 287, 292, 293, 296, 299.2, 303, 304, 289, 299.4, 298.1, 291, 292

[56] References Cited

U.S. PATENT DOCUMENTS 3,938,012  2/1976  Patti ................... 317/249 T
4,234,139  11/1980  Porchia ................ 242/191
5,172,039  12/1992  Owens ................. 318/489

Primary Examiner—Gerald P. Tolin
Assistant Examiner—Anthony Dinkins
Attorney, Agent, or Firm—Rogers & Killeen

[57] ABSTRACT

A variable capacitor and method of varying capacitance in which two pressurally engaged plates having electrically conductive patterns on facing surfaces are separated by a low friction polytetrafluoroethylene (Teflon™) dielectric disk so that the plates may be rotated relative to one another to vary capacitance. Each of the facing surfaces of the plates include two spaced semicircular patterns, one that is electrically connected to the capacitor and one that is not, for maintaining the separation of the plates from the disk. The dielectric disk may be ten to twenty times thicker than the semicircular patterns.

25 Claims, 1 Drawing Sheet

VARIABLE CAPACITOR AND METHOD

BACKGROUND OF THE INVENTION

The present invention is directed to a variable capacitor, and more specifically to a variable capacitor and method in which pressurally engaged plates separated by a low friction dielectric are rotated relative to one another to vary capacitance.

Some radio frequency (RF) turning functions cannot be performed by conventional electronic turning devices due to the large voltages and currents that may be present under some operating conditions, such as during certain impedance transformations. Capacitors available for use in RF devices that operate under such conditions include capacitors with multiple spaced apart electrically conductive plates that are rotated relative to another set of such plates interleaved with the first set to vary capacitance. The dielectric between adjacent plates is typically air to reduce friction. Because of the dielectric properties of air, the number of plates and the space between the plates can be relatively large. Thus, such variable capacitors can be expensive and consume relatively large amounts of space.

Accordingly, it is an object of the present invention to provide a novel variable capacitor and method that obviates the problems of the prior art.

It is further object of the present invention to provide a novel variable capacitor and method in which the number of plates and the space between the plates is reduced from that needed for air dielectric variable capacitors.

It is still a further object of the present invention provide a novel variable capacitor and method in which two plates pressurally engage a disk of low friction dielectric therebetween to reduce space and cost.

It is yet a further object of the present invention to provide a novel variable capacitor and method in which a Teflon™ disk separates two pressurally-engaged, rotatable circuit boards, each with a thin pattern of electrically conductive material thereon.

It is another object of the present invention to provide a novel variable capacitor and method in which two pressurally engaged, rotatable plates are circuit boards that have two semicircular patterns thereon, one that is electrically connected to the capacitor and one that is not, the two patterns keeping the plates a predetermined distance from a low friction dielectric therebetween.

It is yet another object of the present invention to provide a novel method of varying capacitance in which plates compress a Teflon™ dielectric disk therebetween and in which the friction between the plates and the disk allows the plates to be rotated relative to one another to vary capacitance.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
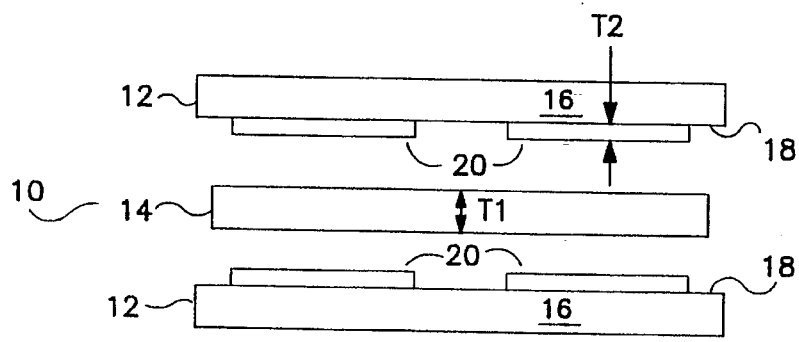
FIG. 1 is an exploded pictorial depiction of a side view of an embodiment of the variable capacitor of the present invention.
Figure 2:
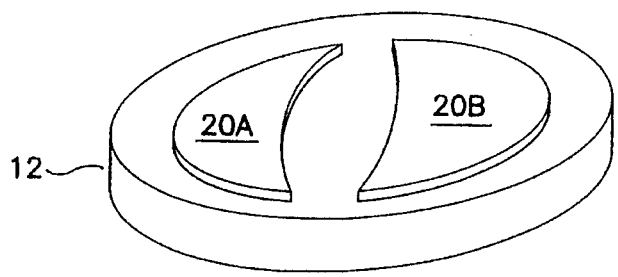
FIG. 2 is an oblique pictorial view of a top of a plate of an embodiment of the present invention illustrating the patterns that may be printed on the plate.

With reference to FIGS. 1 and 2, an embodiment 10 of the variable capacitor of the present invention may include two circuit boards 12 separated by and in pressural engagement with a low friction dielectric disk 14, such as polytetrafluoroethylene (i.e., Teflon™), of thickness T1. Each of the two circuit boards 12 may include a dielectric support 16 having a surface 18 facing the disk 14, and two spaced patterns 20 of thickness T2 on the surface 18, one of the two patterns (20A) being electrically conductive and connected as a plate in the capacitor 10 and the other pattern (20B) not being electrically connected. The two circuit boards 12 may be coaxial with the disk 14, and rotatable relative to each other so that the electrically connected pattern 20A in one of the circuit boards 12 can be moved into and out of a position opposing the electrically connected pattern 20A in the other one of the circuit boards 12. The capacitance may be varied by rotating one (or both) of the circuit boards 12 relative to the other to thereby vary the overlap between the electrically connected patterns 20A in the circuit boards 12, with maximum capacitance being obtained with maximum overlap.

The circuit boards 12 and disk 14 may be pressed together to reduce the space consumed by the capacitor 10. The low friction property of the dielectric disk 14 facilitates rotational movement of the circuit boards 12 relative to the disk, despite the pressure. The patterns 20 are preferably electrically conductive metal printed on the circuit boards 12 and the thickness T2 of patterns 20 is desirably less than the thickness T1 of the disk 14 to further facilitate relative rotation. For example, the thickness T2 may be one tenth to one twentieth the thickness T1 with thickness T1 being eight to twelve mil. The dielectric supports 16 may be conventional printed circuit board material. The periphery of the boards 12 and disk 14 may be generally round as illustrated, or may take other shapes suitable for a particular application or manufacturing process.

While only pattern 20A on each circuit board 12 need be electrically connected to the capacitor, the second pattern 20B may be provided to maintain the separation between the disk 14 and surface 18 of the circuit board 12. If the second pattern 20B were not present, the separation between the disk 14 and surface 18 would likely decrease as pressure is applied to the circuit boards 12. The second pattern 20B may be printed on the circuit board 12 in the same steps and with the same material as pattern 20A.

Figure 3:
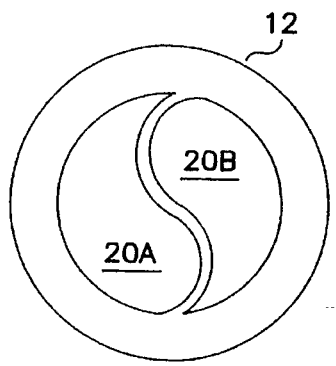
FIG. 3 is a top plan view of another embodiment of the patterns on a plate of the present invention.

The two patterns 20A and 20B may be designed to further facilitate relative movement of the circuit boards and disk, and to modify the variation of capacitance as a function of the relative position of the conductive patterns 20A on the two circuit boards 12. To facilitate relative movement, the space between the two patterns 20 may extend radially outward with a variable angle, thereby reducing the potential for restraining movement of the board 12 relative to the disk 14. For example, as illustrated in FIG. 3, the space between the two patterns may be sinuous, with other alignments being apparent to those of skill in the art. The periphery of the patterns 20 may be generally round as illustrated, or take other shapes suitable for a particular application or manufacturing process.

Figure 4:
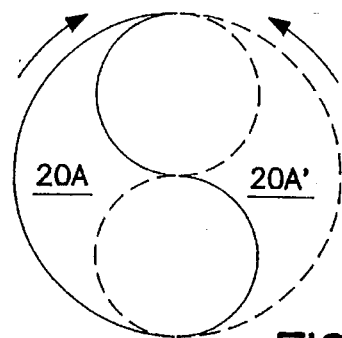
FIG. 4 is a pictorial depiction of the overlap of electrically conductive patterns in an embodiment of the present invention.

The rate of change of capacitance (aside from the rate of change due to the rate of relative rotation of the boards 12) may also be adjusted by modifying the amount of overlap of electrically connected patterns 20A relative to the angular displacement of the boards 12. For example, as illustrated in FIG. 4, two patterns 20A (one pattern 20A' being shown in dashed lines) of the sinuous pattern of FIG. 3 may be used to spread the transition ten to twenty degrees to provide greater control. The arrows indicate the relative rotation of the two patterns. In this arrangement, the spaces between patterns 20 on the two boards 12 cannot be aligned when the two boards are pressurally engaged.

Figure 5:
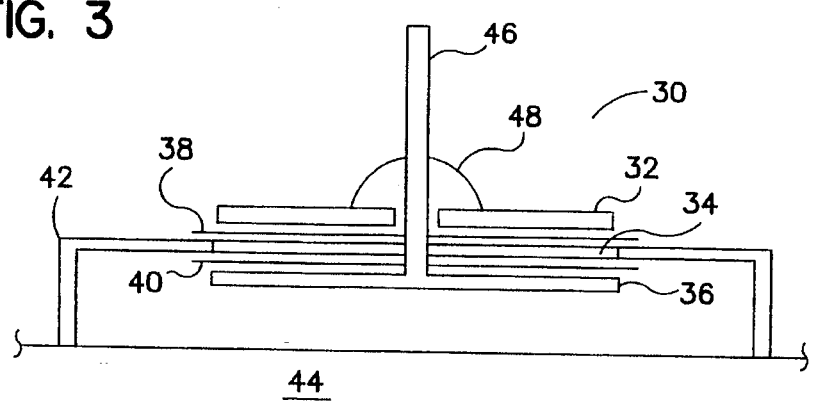
FIG. 5 is a side view of another embodiment of the present invention.

With reference now to FIG. 5, another embodiment 30 of the variable capacitor of the present invention may include three capacitive plates 32, 34, and 36 and two dielectric disks 38 and 40. The middle plate 34 may be affixed to or part of a platform 42 for holding the plates and disks spaced from a base 44. The top and bottom plates 32 and 36 may be carried by a rotatable axle 46 for rotation therewith. For example, the bottom plate 36 may be attached directly to the axle 46 and the top plate 32 may be attached to the axle 46 with a spring mechanism 48 for pressing the plates and disks together with the requisite pressure. The disks 38 and 40 may be similar to the disk 14 described above, and the plates 32, 34, 36 may be similar to the circuit boards 12 described above, with the middle plate 34 having patterns 20 on both surfaces. The middle plate 34 may be "hot" with electrical connection extending through the platform 42, and the other two plates may be "cold" or grounded through the axle.

In a preferred embodiment having the structure of FIG. 5 and capable of achieving a breakdown voltage of 5000 volts, the dielectric disk is ten mil thick Teflon™, the patterns (illustrated in FIG. 3) are one mil thick and printed onto circuit boards made of G10 epoxy/glass laminate having a typical thickness of about three to six one hundredths of an inch. The pressure holding the circuit boards and disk together is provided by a metal spring and is sufficient to keep the boards and disk flat and in intimate contact without bowing. The entire structure is about three inches in diameter and about one-half inch high. The capacitance may vary from 10 pF to 300 pF in 180 degrees.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A variable capacitor comprising:
   two circuit boards separated by and in pressural engagement with a polytetrafluoroethylene disk of thickness T1,
   each of said two boards comprising a dielectric support having a first surface facing an opposing surface of said disk, and two spaced semicircular patterns of thickness T2 on said first surface, one of said two patterns being electrically connected in said capacitor, and
   said two boards being coaxial with said disk and movable relative to each other so that the electrically connected one of said two patterns in one of said two boards can be moved into and out of a position opposing the electrically connected one of said two patterns in the other one of said two boards.

2. The variable capacitor of claim 1 wherein thickness T2 is less than thickness T1.

3. The variable capacitor of claim 2 wherein the ratio of thickness T2 to thickness T1 is between 0.10 and 0.05.

4. The variable capacitor of claim 1 wherein the space between said two patterns on one of said two boards cannot be aligned with the space between said two patterns on the other of said two boards when said two boards are in pressural engagement with said disk.

5. The variable capacitor of claim 1 wherein the space between said two patterns on at least one of said two boards extends radially outward with a variable angle.

6. The variable capacitor of claim 5 wherein the space between said two patterns on at least one of said two boards is sinuous.

7. The variable capacitor of claim 1 further comprising a third circuit board and a second said disk coaxial with said two boards and said disk and in pressural engagement therewith.

8. The variable capacitor of claim 7 wherein said third board has a first surface with an electrically connected semicircular pattern thereon facing said second disk and one of said two boards has a second surface with an electrically connected semicircular pattern facing an opposing side of said second disk.

9. The variable capacitor of claim 8 wherein said third board and one of said two boards move together relative to the other of said two boards.

10. The variable capacitor of claim 1 wherein the pressural engagement maintains intimate contact between said two boards and said disk.

11. A variable capacitor comprising:
    two circuit boards separated by and in pressural engagement with a polytetrafluoroethylene disk, said two boards being movable relative to each other,
    each of said two boards having a first surface facing an opposing surface of said disk, and an electrically connected pattern on said first surface, and having a second pattern on said first surface that is not electrically connected, said second pattern for maintaining said disk and said first surface a predetermined distance apart,
    said electrically connected pattern having an edge that extends radially outward at a variable angle, said variability of said pattern edge on one of said boards being different from said variability of said pattern edge on the other of said boards.

12. The variable capacitor of claim 11 wherein a space between the electrically connected pattern and the second pattern on one of said two boards cannot be aligned with a space between the electrically connected pattern and second pattern on the other of said two boards when said two boards are in pressural engament with said disk.

13. The variable capacitor of claim 11 wherein a space between the electrically connected pattern and the second pattern on at least one of said two boards is sinuous.

14. The variable capacitor of claim 11 further comprising a third circuit board and a second said disk coaxial with said two boards and said disk and in pressural engagement therewith.

15. The variable capacitor of claim 14 wherein said third board and one of said two boards move together relative to the other of said two boards.

16. A variable capacitor comprising:
    a first plate spaced from and fixed relative to a base;
    a low friction disk on each side of said first plate;

a rotatable axle extending through said first plate and each said disk;

a second plate carried by said axle on the exposed side of each said disk so that each said second plate rotates together relative to said first plate;

means for pressurally engaging said first and second plates and each said disk;

said first plate comprising a dielectric support and two surfaces, each facing one said disk and each having an electrically conductive pattern thereon connected to a capacitor first terminal; and each said second plate comprising a dielectric support and one surface facing one said disk and having an electrically conductive pattern thereon connected to a capacitor second terminal.

17. The variable capacitor of claim 16 wherein said means for pressurally engaging comprises a spring for applying pressure to one said second plate to thereby force it towards the other said second plate that is affixed to said axle.

18. The variable capacitor of claim 17 wherein said second terminal is ground.

19. The variable capacitor of claim 17 wherein each said disk is polytetrafluoroethylene eight to twelve mil thick.

20. The variable capacitor of claim 17 wherein the pressural engagement maintains intimate contact between said two plates and said disk while preventing bowing.

21. A method of varying capacitance comprising the steps of pressurally engaging dielectric plates having electrically conductive faces separated by a polytetrafluoroethylene disk, each of the faces including two spaced semicircular patterns, one that is electrically connected to the capacitor and one that is not, and rotating one of the plates relative to the other to vary capacitance.

22. The method of claim 21 wherein the two spaced semicircular patterns are the same thickness, and the ratio of the thickness of the semicircular patterns to the thickness of the disk is between 0.10 and 0.05.

23. The method of claim 21 wherein the facing edges of the patterns extend radially at a variable angle.

24. A method of maintaining a predetermined separation of pressurally engaged, rotatable capacitive plates in a variable capacitor comprising the steps of providing capacitive plates that are circuit boards, and providing two semicircular patterns on each of the circuit boards, one pattern being electrically connected to the capacitor and one not, the two patterns being the same thickness, whereby the plates are kept a predetermined distance from a low friction dielectric therebetween during rotation.

25. The method of claim 24 wherein the low friction dielectric between the plates is a disk of polytetrafluoroethylene that is thicker than the patterns.

* * * * *